United States Patent [19]

Boggs et al.

[11] Patent Number: 5,537,560
[45] Date of Patent: Jul. 16, 1996

[54] METHOD AND APPARATUS FOR CONDITIONALLY GENERATING A MICROINSTRUCTION THAT SELECTS ONE OF TWO VALUES BASED UPON CONTROL STATES OF A MICROPROCESSOR

[75] Inventors: Darrell D. Boggs, Aloha; Alan B. Kyker, Portland; Scott D. Rodgers, Hillsboro, all of Oreg.

[73] Assignee: Intel Corporation, Santa Clara, Calif.

[21] Appl. No.: 203,783

[22] Filed: Mar. 1, 1994

[51] Int. Cl.$^6$ .................................................. G06F 9/30
[52] U.S. Cl. .................. 395/375; 395/800; 364/938; 364/938.4; 364/946.2; 364/946.6; 364/949.1; 364/949.2; 364/DIG. 2; 364/261.3; 364/261.9; 364/261.8
[58] Field of Search .................................. 395/800, 375; 364/DIG. 1, DIG. 2

[56] References Cited

U.S. PATENT DOCUMENTS

| | | | |
|---|---|---|---|
| 4,459,666 | 7/1984 | Kruger | 395/425 |
| 4,675,843 | 6/1987 | Vautier | 395/375 |
| 4,881,194 | 11/1989 | Sprague et al. | 395/375 |
| 5,095,527 | 3/1992 | Oramoto et al. | 395/800 |
| 5,134,561 | 7/1982 | Liptay | 395/425 |
| 5,191,649 | 3/1993 | Cadambi et al. | 395/200 |
| 5,193,158 | 3/1993 | Kinney et al. | 395/375 |
| 5,226,130 | 7/1993 | Favor et al. | 395/375 |
| 5,353,421 | 10/1994 | Emma et al. | 395/375 |

FOREIGN PATENT DOCUMENTS 0211487  2/1987  European Pat. Off. .

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.

Tse Yu Yeh et al; "Two–level adaptive Branch prediction"; 24th ACM/IEEE International Symposium and Workshop on Micro Architecture Nov. 1991, pp. 51–61.

Tse Yu Yeh et al; "Alternative Implementations of Two–level Adaptive Branch Prediction" Proceedings of the 19th International Symposium on Computer Architecture May 1992.

G. C. Hwang and C. M. Kyung; "New Hardware Scheme supporting precise exception handling for out of order execution"; Electronic letters 6th Jan. 1994, vol. 30, No. 1.

Junien Labrousse, Gerret A. Slavenburg; "A 50MM2 Microprocessor with a Very long Instruction Word Architecture"; IEEE International Solid State Circuit Conference, 1990. Feb. 4.

*Primary Examiner*—Meng-Ai An
*Attorney, Agent, or Firm*—Blakely, Sokoloff, Taylor & Zafman

[57] ABSTRACT

The present invention provides a microinstruction for conditionally selecting one of two data values based upon control states of a processor. The microinstruction is preferably utilized in an out-of-order processor, although it may be used in conventional processors, to perform state dependent operations, including but not limited to privilege or mode sensitive instruction checking, privilege or mode sensitive algorithm execution and processor state updating. This is accomplished through the issuance from microcode to an execution unit upon decoding of a state dependent instruction a conditional move operation that takes advantage of condition resolving circuitry implemented within the execution unit. The execution unit's circuitry makes available processor state information in the form of result values that can be immediately used by the microinstruction upon its execution to resolve the conditions which it specifies. Upon immediate resolution of a specified condition, one of two values (or microcode temporary registers having values therein) is selected in order to properly complete the state dependent operation or to take other appropriate action such as posting a fault.

21 Claims, 3 Drawing Sheets

METHOD AND APPARATUS FOR CONDITIONALLY GENERATING A MICROINSTRUCTION THAT SELECTS ONE OF TWO VALUES BASED UPON CONTROL STATES OF A MICROPROCESSOR

BACKGROUND OF THE INVENTION

1. Field of the Invention

This invention relates to programming operations in a microprocessor, and more specifically, to the use of a conditional move microinstruction for implementing processor state dependent operations. The invention is particularly pertinent to speculative, out-of-order processors which predict program flow and execute instructions out-of-order, but may also be used in conventional pipelined and non-pipelined processors.

2. Art Background

I. State Dependent Operations in Pipelined, In-Order Microprocessors

Simple microprocessors generally process instructions one at a time. Each instruction can be considered as being processed in five sequential stages: instruction fetch, instruction decode, operand fetch, execute and writeback. During instruction fetch, an instruction pointer from a program counter is sent to an instruction memory, such as an instruction cache, to retrieve a macroinstruction. The macroinstruction is decoded into microinstructions or micro-operations (uops) which specify an opcode in addition to source and destination register addresses. During operand fetch, a register file is addressed with the source register addresses to return the source operand values. In the execution stage, the uop and the source operand values are sent to an execution unit for execution. During writeback, the result value of the microinstruction execution is written to the register file at the destination register address encoded in the microinstruction.

Within simple microprocessors, different dedicated logic blocks perform each processing stage. Each logic block waits until all the previous logic blocks complete operations before beginning its operation. Without pipelining, the microprocessor processes the uops sequentially one after another. However, to improve microprocessor efficiency, microprocessor architectures are now designed with overlapped pipeline stages so that the microprocessor can operate on several uops simultaneously.

In the processing of state dependent instructions, the results derived from execution of these instructions depend upon the current state of the microprocessor. But since the state of the processor may be changed by certain control instructions which may be fetched and decoded but not executed before the fetching of the state dependent instructions, it is possible that some state dependent instructions will be erroneously fetched. This is because the fetching of a state dependent instruction is based upon a processor state that may subsequently be modified by a previously fetched control instruction. In this case, the processor would have to detect the change in state and the fact that a particular state dependent instruction was erroneously fetched so as to stop the execution of the state dependent instruction and cause a fault to occur indicating that the state dependent instruction should not be executed and that another flow of uops should be fetched.

In order to prevent such a situation from occurring, conventional pipelined processors are designed to detect the existence of a control instruction at the decode stage and stall the pipeline by issuing fake uops (no-ops) to the execution unit until the result of the control instruction (i.e. a possible change in state) is determined during its execution. Once the control instruction reaches the execution unit and its execution is complete, the decoder is informed of any change in state and can resume the normal fetching of instructions. Obviously, processors which utilize this method incur a performance penalty due to the number of clock cycles that are wasted during the pipeline stall.

Additionally, in the execution of state dependent instructions, many clock cycles are required to access the state information needed and to resolve their dependencies. For example, in execution of a privileged instruction, the processor would have to read the proper control registers, place the information in the proper format, compare the proper values and perform a select (i.e. a conditional move operation) based upon the comparison. For example, consider the relatively complex pseudo-instruction shown below:

IF [(CPL=0) & (IOPL=3) & (VME)], THEN SELECT A (INSTRUCTION EXECUTION), OR ELSE B (FAULT)

In order to resolve the above condition, the following pseudo-uops would be required:

A: T0:= compare (CPL,0)

T1:=select_Equal(A,B)

B: T0:=compare (IOPL,3)

T1:=select_Equal(T1,B)

C: T0:=compare (VME, TRUE)

T1:=select_Equal(T1,B)

The value within register T1 can then be checked by microcode to determine whether execution of the instruction can proceed (T1=A) or whether a fault must be posted (T1=B). In calculation of these operations, however, the processor would require many clock cycles (i.e. approximately 5) in order to (A) read the CPL control register, do a mask to get the lower 2 bits of the CPL register, and compare CPL to 0; (B) read the IOPL value, mask and shift the value, and compare IOPL to 3; and (C) read the processor mode, mask the mode value, and check to see if the mode is enabled. Nonetheless, even after all this has been done, the result of these calculations may indicate that sufficient privilege does not exist, thereby requiring microcode to signal a fault to the writeback logic of the execution unit so that a fault can be posted instead of executing the privileged instruction.

Furthermore, the performance of privilege or mode sensitive algorithms and updates based on processor state (i.e. instructions that modify the control flags based upon processor mode) also give rise to a similar performance penalties. In the case where instructions which modify the control are executed, for example STI, CLI and IRET in the Intel architecture, the execution unit will take several cycles to determine the current processor mode. Thereafter, based on the current mode, a jump (or branch) will or will not be taken to an algorithm or routine which determines whether a particular control flag will be modified. Yet, for processors which predict the flow of instructions instead stalling the pipeline, if the branch is conditionally taken and later found to be mispredicted, more cycles will be lost due to the instructions that were speculatively fetched which must now be canceled or flushed from the pipeline.

Hence, the performance of the above state dependent operations in conventional in-order, pipelined processors significantly reduces the efficiency of the processor due to the wasted cycles needed to stall the processor upon detection of control instructions and those required to resolve the conditions of state dependent instructions or recover from mispredicted branches.

II. Speculative, Out-of-Order Processors

For pipelined microprocessors to operate more efficiently, an instruction fetch unit at the head of the pipeline must continually provide the pipeline with a stream of instructions. However, conditional branch instructions within an instruction stream prevent the instruction fetch unit from fetching subsequent instructions that are known to be correct since the conditions for such instructions are not resolved until execution.

To alleviate this problem, some newer pipelined microprocessors use branch prediction mechanisms that predict the outcome of branches, and then fetch subsequent instructions according to the branch prediction. Branch prediction is achieved using a branch target buffer to store the history of a branch instruction based only upon the instruction pointer or address of that instruction. Every time a branch instruction is fetched, the branch target buffer predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order completion, any number of instructions are allowed to be in execution in the execution units, up to the total number of pipeline stages in all the functional units. Instructions may complete out of order because instruction dispatch is not stalled when a functional unit takes more than one cycle to compute a result. Consequently, a functional unit may complete an instruction after subsequent instructions have already completed. For a detailed explanation of speculative out-of-order execution, please refer to M. Johnson, *Superscalar Microprocessor Design*, Prentice Hall, 1991, Chapters 2,3,4, and 7.

In a processor using out-of-order execution, instruction dispatch is stalled when there is a conflict for a functional unit or when an issued instruction depends on a result that is not yet computed. In order to prevent or mitigate stalls in decoding, the prior art provides for a temporary storage buffer (referred to herein as a dispatch buffer) between the decode and execute stages. The processor decodes instructions and places (or "issues") them into the dispatch buffer as long as there is room in the buffer, and at the same time, examines instructions in the dispatch buffer to find those that can be dispatched to the execution units (i.e. those instructions for which all source operands and the appropriate execution units are available).

Instructions are dispatched from the dispatch buffer to the execution units with little regard for their original program order. However, the capability to issue instructions out-of-order introduces a constraint on register usage. To understand this problem, consider the following pseudo-microcode sequence:

1. t←load (memory)
2. eax←add (eax,t)
3. ebx←add (ebx,eax)
4. eax←mov (2)
5. edx←add (eax,3)

The micro-instructions and registers shown above are generic and will be recognized by those familiar with the art as those of the well known Intel microprocessor architecture.

In an out-of-order machine executing these instructions, it is likely that the machine would complete execution of the fourth instruction before the second instruction, because the third ADD instruction may require only one clock cycle, while the load instruction and the immediately following ADD instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction would use, the fourth instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

It is known in the art that storage conflicts can be avoided by using register renaming where additional registers are used to reestablish the correspondence between registers and values. Using register renaming, the additional "physical" registers are associated with the original "logical" registers and values needed by the program. To implement this technique, the processor typically allocates a new register for every new value produced (i.e., for every instruction that writes a register). An instruction identifying the original logical register for the purpose of reading its value obtains instead the value in the newly allocated register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a$←load (mem)
2. $eax_b$←add ($eax_a,t_a$)
3. $ebx_b$←add ($ebx_a,eax_b$)
4. $eax_c$←mov (2)
5. $edx_a$←add ($eax_c,3$)

In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional storage unit (referred to herein as a reorder buffer), and its destination register number is associated with this location. This renames the destination register to the reorder buffer location. When a subsequent instruction refers to the renamed destination register, in order to obtain the value considered to be stored in the register, the instruction may instead obtain the value stored in the reorder buffer if that value has already been computed.

The use of register renaming in the reorder buffer not only avoids register resource dependencies to permit out-of-order execution, but also plays a key role in speculative execution. If the instruction sequence given above is considered to be part of a predicted branch, then one can see that execution of those instructions using the renamed registers in the reorder buffer has no effect on the actual registers denoted by instruction. Thus, if it is determined that the branch was mispredicted, the results calculated and stored in the reorder buffer may be erased and the pipeline flushed without affecting the actual registers found in the processor's register file. If the predicted branch affected the values in the register file, then it would be difficult to recover from branch misprediction because it would be difficult to determine the values stored in the registers before the predicted branch was taken without the use of redundant registers in the reorder buffer.

When a result is output from an execution unit, it is written back to the reorder buffer. The result may also provide an input operand to one or more waiting instructions buffered in the dispatch buffer, indicating that the source operand is ready for dispatch to one or more execution units along with the instructions using the operand. After the value is written into the reorder buffer, subsequent instructions continue to fetch the value from the reorder buffer, unless the entry is superseded by a new register assignment and until the value is retired by writing it to the register file.

After the processor determines that the predicted instruction flow is correct, the processor commits the speculative results of those instructions that were stored in the reorder buffer to an architectural state by writing those results to the register file. This process is known as retirement wherein the instructions are architecturally committed or retired according to their original program order (i.e. the original instruction sequence).

III. State Dependent Operations in Out-of-Order Processors

In out-of-order microprocessors, the processor state needed for execution of state dependent instructions is located either in the register file or in microcode control registers distributed throughout the processor's architecture. However, due to the speculative, out-of-order nature of the processor, the problems involved with processing state dependent operations, such as checking privileged instructions, executing privilege or mode sensitive algorithms and updating processor state, become much worse.

One problem is in the out-of-order nature of execution which gives rise to significantly greater performance penalties. The number of pipestages for an out-of-order processor between the decode stage and the retirement stage (where the register file is updated) is increased by approximately 10 stages over that for an in-order processor. Hence, a pipeline stall at the decode stage caused by a control instruction requesting a change of state would waste many more cycles in an out-of-order processor, thereby increasing the performance penalty to an unacceptable value. However, out-of-order does not, in and of itself, increase the length of the pipeline. In one embodiment of the present invention, the microprocessor uses superpipelining, a technique which increases the number of stages in each pipe while shortening each stage. This is done so that pipe stages which require short periods of time to execute are not penalized due to longer periods required by preceding or subsequent pipe stages. This technique is what increases the number of pipe stages in the present invention over past implementations. The primary affect of out-of-order execution is the increase in the number of microinstructions which may be outstanding in the portion of the pipeline which supports out-of-order execution. Also, note that out-of-order execution allows operations which come after a given operation to contend for execution unit resources in some cases. This can further lengthen the pipeline for a microinstruction in the pipeline.

Similarly, the pipeline length in addition to the size of the reorder buffer determine the number of speculative uops that are in the pipeline at any one time, this number ranging between approximately 30–50 uops. Therefore, the cost of taking a speculative branch (i.e. by predicting the result of a conditional move or jump instruction) later found to be mispredicted (at the execute stage) would give rise to another unacceptable performance penalty due to the large number of speculative uops that would have to be flushed in addition to the lost opportunity costs in terms of the clock cycles wasted by the flushed uops.

Furthermore, with regard to microcode determining processor state at the decode stage, such as with privileged instruction checking, the disjunction between the instruction decoder, the execution units and the retirement logic in an out-of-order processor would also require a substantial investment in hardware and microcode to enable state updates to occur at the various functional units throughout the processor. Since the back-end, out-of-order functional units have little control over the front-end, in-order functional units, a substantial amount of communications or signaling hardware would have to be implemented between the decoder and the updated processor state kept in the real register file and in microcode registers throughout the processor. Even so, the broadcasting of state updates would cause more penalties due to the multiple state updates required for each state change.

Accordingly, it is an object of the present invention to provide a method and apparatus in a microprocessor for conditionally selecting one of two data values based upon control states of a processor via a microinstruction.

It is another object of the present invention to provide a method and apparatus for performing processor state dependent operations in an out-of-order processor through the use of microcode while minimizing performance penalties caused by pipestailing, conditional moves and conditional jumps.

It is a further object of the present invention to provide a method and apparatus for performing privileged instruction checking, privilege or mode sensitive algorithm execution and privileged updating in an out-of-order processor through the use of a microinstruction that avoids the complexity and expense of dedicated hardware that would otherwise have to be implemented between the front-end and back-end of the processor.

SUMMARY OF THE INVENTION

The present invention provides a microinstruction for conditionally selecting one of two data values based upon control states of a processor. The microinstruction is preferably utilized in an out-of-order processor, although it may be used in conventional processors, to perform state dependent operations, including but not limited to privilege or mode sensitive instruction checking, privilege or mode sensitive algorithm execution and processor state updating. This is accomplished through the issuance from microcode to an execution unit upon decoding of a state dependent instruction a conditional move operation that takes advantage of condition resolving circuitry implemented within the execution unit. The execution unit's circuitry makes available state information in the form of result values that can be immediately used by the microinstruction upon its execution to resolve the conditions which it specifies. Upon immediate resolution of a specified condition, one of two values (or microcode temporary registers having values therein) is selected in order to properly complete the state dependent operation or to take other appropriate action such as posting a fault.

DETAILED DESCRIPTION OF THE INVENTION

The present invention provides a method and apparatus for performing processor state dependent operations in a microprocessor through the use of a microinstruction that selects one of two data values based upon control states of a processor. For purposes of explanation, specific embodiments are set forth in detail to provide a thorough understanding of the present invention. However, it will be apparent to one skilled in the art that the present invention may be practiced with other embodiments and without all the specific details set forth. In other instances, well known elements, devices, circuits, process steps and the like are not set forth in detail in order to avoid unnecessarily obscuring the present invention.

I. System Block Diagram

Figure 1:
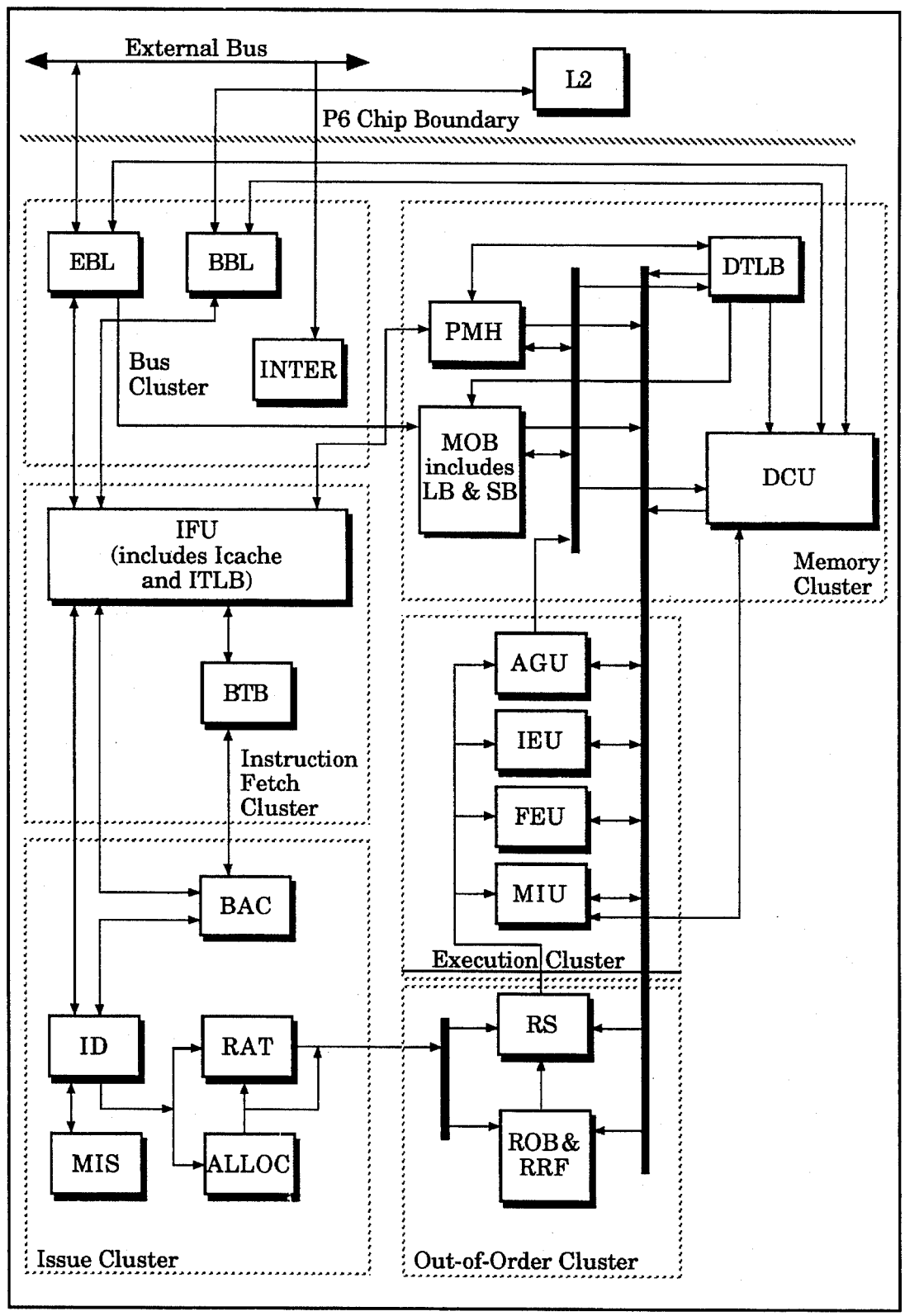
FIG. 1 is generalized block diagram of one embodiment of the microprocessor in which the present invention is utilized.

FIG. 1 is a generalized block diagram of one embodiment of a speculative, out-of-order processor according to the present invention. This particular embodiment includes a variety of functional units grouped together in clusters forming a bus cluster, an instruction fetch cluster, an issue cluster, an out-of-order cluster, an execution cluster and a memory cluster. In particular, these clusters can be further categorized into an in-order section comprising the bus cluster, the instruction fetch cluster and the issue cluster, and an out-of-order section comprising the out-of-order cluster, the execution cluster and the memory cluster.

Figure 2:
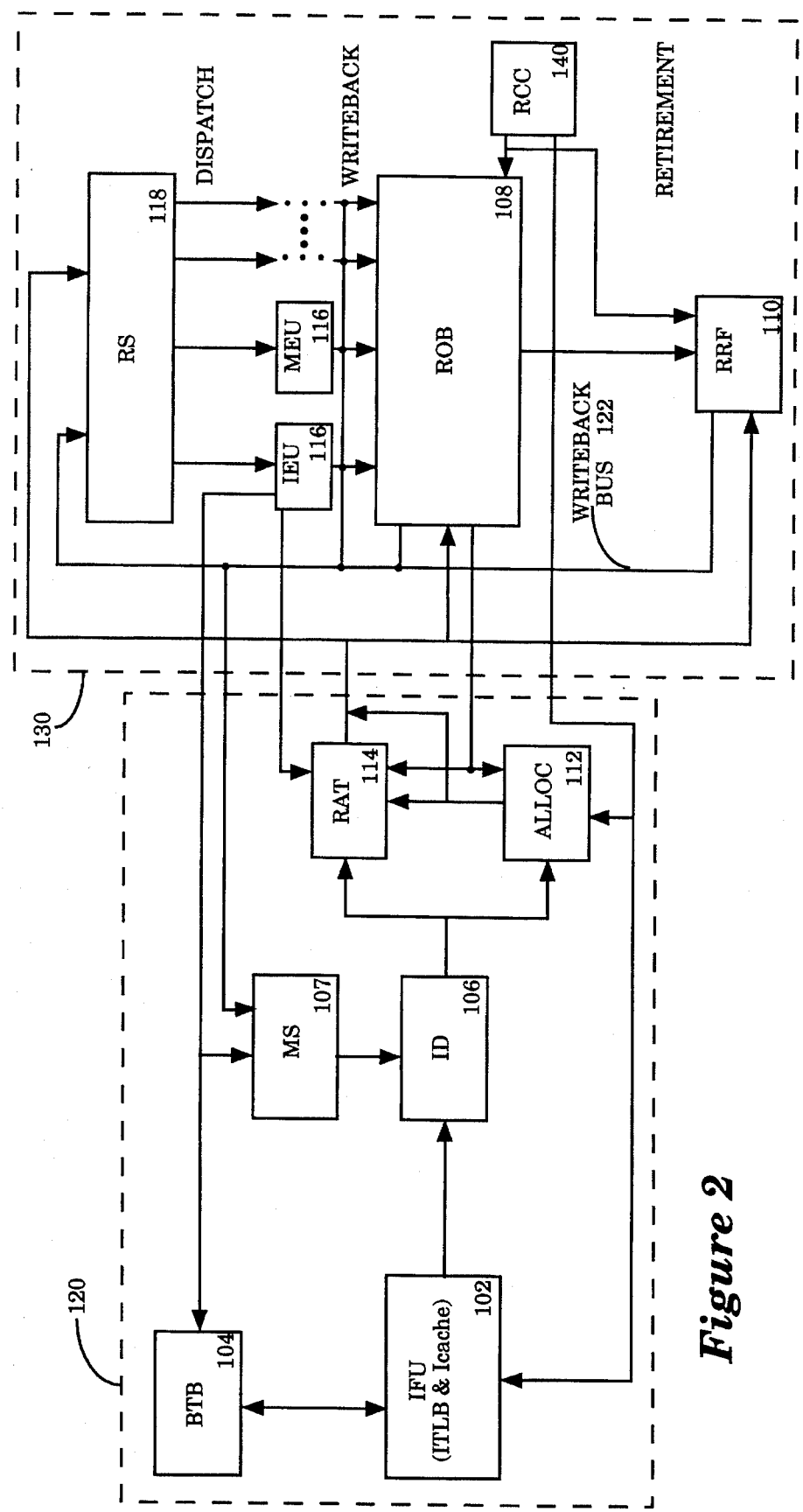
FIG. 2 is a block diagram of the microprocessor shown in FIG. 1 in which the pertinent in-order, front-end functional units and out-of-order, back-end functional units are shown.

The functional units and corresponding interconnections pertinent to the description of the present invention are shown in more detail in FIG. 2. With reference to FIG. 2, the in-order section (or front-end) of the microprocessor is denoted as 120, while the out-of-order section (or back-end) is denoted as 130. The in-order section 120 includes an instruction fetch unit (IFU) 102 having an instruction cache (ICACHE) and an instruction translation lookaside buffer (ITLB) (neither being shown), a branch target buffer (BTB) 104, and instruction decoder (ID) 106, a microinstruction sequencer (MS) 107, an allocator (ALLOC) 112 and a register alias table (RAT) 114. The out-of-order section 130 includes a reservation station (RS) 118, a number of execution units (EUs) 116 (i.e. an instruction execution unit (IEU) and a memory execution unit (MEU)), a retire control circuit (RCC) 140, a reorder buffer (ROB) 108 and a real register file (RRF) 110.

In the front end 120, the IFU 102 is coupled to the BTB 104 and the ID 106. The BTB 104 provides a predicted instruction pointer (IP) to the IFU 102. The ITLB of the IFU 102 maps the linear address pointed to by the IP into a physical address and the IFU 102 fetches macroinstructions from its ICACHE at the location indicated by the physical address.

Each instruction is decoded into one or more micro operations (uops) by the ID 106 with the help of the MS 107. The ID 106 provides up to four microinstructions (and the MS 107 can provide additional) in response to a corresponding microinstruction pointer (uip) that points to the first instruction in the sequence. The MS 107 also implements special microcode sequences for handling events including exceptions and assists, and in one embodiment, emulates the handling routines used by the Intel microprocessor architecture.

The ID 106 transfers the stream of uops to the RAT 114 and the ALLOC 112. In one embodiment, the ID 106 issues up to three in-order uops during each clock cycle of the processor. The ALLOC 112 assigns each incoming uop a location in the ROB 108 in the same order as it was received from the ID 106, thereby mapping the logical destination address (LDST) of each uop to a corresponding physical destination address (PDST) of the ROB 108. The ALLOC 112 maintains an allocation pointer pointing to the next ROB 108 entry to be allocated. The ALLOC 112 also receives a retirement pointer from the RCC 140, indicating which uops stored in the ROB 108 are to be committed to architectural state in the RRF 110. Based upon the received retirement pointer, the ALLOC 112 deallocates retired PDST entries of the ROB 108 to make them available for reallocation.

The RAT 114 maintains the mapping between LDST's and PDST's. To account for retirement, the RAT 114 stores a real register file valid bit (RRFV) that indicates whether the value indicated by the LDST is to be found at the PDST of the ROB 108 or in the RRF 110 after retirement. Based upon this mapping, the RAT 114 also associates every logical source address to a corresponding PDST of the ROB 108 or the RRF 110 (the source operand of one instruction generally must have been the destination of a previous instruction).

Each incoming uop is also assigned and written into a PDST entry in the RS 118 by the ALLOC 112. The RS 118 assembles the uops awaiting execution by an appropriate EU 116, such as the IEU 116 or MEU 116. When all the source operands of a uop are available and the appropriate EU 116 (specified by an opcode) is ready, the uop is dispatched from the RS 118 to the EU 116 for execution. The EU 116 then writes back result data and any appropriate flags via a writeback bus 122 into the ROB 108 at the location indicated by the PDST of the dispatched uop. The EU 116 also writes back into the PDST entry of the ROB 108 event information which indicates whether an event has occurred, and if so, the type and specific nature of the event. This event information being used to ensure the proper handling of exceptions and assists, and to correct branch mispredictions.

The ROB 108 is implemented as a circular buffer that stores the speculatively executed results of microinstructions written back from the EU's 116. Once execution has completed and the result data of the uops are determined to be no longer speculative, the uops and their results are committed to architectural state in a process referred to as retirement. Uops stored in the ROB 108 are retired in original program order into the RRF 110 according to a retirement pointer. The retirement pointer is maintained in the RCC 140 and points to all uops for which the processor has determined that the predicted instruction flow is correct.

II. Operation of the Present Invention

The present invention provides a microinstruction (hereinafter referred to as "PSELECT") that conditionally selects one of two data values based upon control states of a processor. The processor control states comprise the operating modes of the processor in addition to the privileges granted to tasks being performed by the processor (i.e. the privileged state provided to a program during its execution). PSELECT is a variation of a conditional move operation which is used by microcode to implement processor state dependent operations. In order to minimize the amount of microcode and time required to perform state dependent operations in an out-of-order processor, the state information needed for such operations is collected and centralized in the proper format (i.e. designed to resolve a predetermined condition) in the hardware of the EU's 116.

Although any method of collecting such state information at the EU's 116 is sufficient for use of the microinstruction forming the present invention, the following is a description of how state information is collected in accordance with the preferred embodiment of the present invention. For state obtained from EFLAGS, dedicated wires are used to route the appropriate state bits from the RRF 110 to the EU's 116. For control register state, a copy of the appropriate control register bits are maintained at the EU's 116. Whenever a control register write occurs, the write is broadcast to all the functional units of the microprocessor. If the address of the register indicates one of the control registers for which an EU 116 is caching register information, it updates the appropriate state based on the data written to the control register. For conditions which require comparisons, the appropriate state is obtained as required above and the comparison is performed in the EU's 116, with the results being stored in the EU's 116 for future use.

Upon decoding of state dependent instructions by microcode at the decode stage of instruction processing, the following sequence of uops is issued from a microcode ROM preferably disposed in the ID 106 to the RAT 114 and ALLOC 112 for subsequent allocation in both the RS 118 and ROB 108:

uop(1): SOURCE1 <- vector or data value(s) to be used if the condition is false uop(2): SOURCE2 <- vector or data value(s) to be used if the condition is true uop(3): DEST :=PSELECT.CONDITION(SOURCE2, SOURCE1)

uop(4+): state dependent microinstruction(s) which utilize DEST

Where DEST is the register in which the selected value will be stored, CONDITION indicates the processor state value to be used to determine the result, SOURCE1 is the source input value (or microcode temporary register) to be chosen if the condition is false and SOURCE2 is the source input value (or microcode temporary register) to be chosen if the condition is true. In accordance with one embodiment, it is noted that the zero flag of the DEST register will be set if the value written to DEST is zero. In addition, the SOURCE1 and SOURCE2 assignments above may be avoided by specifying as the source inputs to the microinstruction either immediate values, constant values or memory values.

Upon execution of the PSELECT microinstruction (uop(3)), the specified condition forming the processor state dependency can be immediately satisfied at the EU 116 in order to determine at that stage 1) whether to permit execution of the subsequent uops forming the privileged instruction (i.e. uop(4+)) or to post an exception, 2) which of the subsequent uops forming first and second algorithms should be executed for instructions in which the selection of a particular algorithm depends upon processor state, or 3) whether to execute the subsequent uops that may update a state variable for updates which depend upon processor control states. As an example, consider the following pseudo-instruction presented in the background section in which A and B are again assumed to be either register, immediate, constant or memory values:

[(CPL=0) & (OPL=3) & (VME)], THEN SELECT A (INSTRUCTION EXECUTION), OR ELSE B (FAULT)

In order to resolve the above condition in the preferred embodiment of the microprocessor set forth above using a conditional move operation instead of PSELECT, the following pseudo-uops would have required 15 clock cycles:

A: T0:=compare (CPL,0)

T1:=select_Equal(A,B)

B: T0:=compare (IOPL,3)

T1:=select_Equal(T1,B)

C: T0:=compare (VME, TRUE)

T1:=select_Equal(T1,B)

According to the present invention, however, by providing the CPL and IOPL and VME mode values (in a condition checking format) to the EU's 116 in hardware, all that needs to be done upon decoding of the pseudo-instruction above is for microcode to issue the following sequence of uops into the out-of-order section of the processor:

uop(1): SOURCE1=B uop(2): SOURCE2=A uop(3): T1 :=PSELECT.CPL0_IOPL3_VME-(SOURCE2, SOURC1)

Upon their execution, which requires three cycles as compared to the fifteen previously noted, B will be assigned to SOURCE1, A will be assigned to SOURCE2 and the complex condition (actually forming three different conditions) will be satisfied immediately from the EU's 116 hardware circuitry. Moreover, this execution can be further reduced to one cycle simply by specifying the SOURCE1 and SOURCE2 input values in uop(3) as immediate, constant or memory values such that the assignments in uop(1) and uop(2) are unnecessary as shown below:

uop(1): T1:=PSELECT.CPL0_IOPL3_VME(A,B)

Accordingly, the validity of a privileged instruction's execution or a privileged update can be determined in an out-of-order processor in a relatively short time, thereby reducing the penalties associated with a mispredicted branch. If sufficient privilege exists to perform the execution or the update, the actual operative uops forming the microcode that implements the macroinstruction, which would normally follow the PSELECT uop, would be executed by the EU 116. If sufficient privilege did not exist, then the operative uops would be flushed from the ROB 108 upon recognition of the event by the RCC 140.

Yet, instead of simply avoiding execution of the privileged instruction or privileged update when sufficient privilege does not exist, it is necessary to post a fault indicating that the macroinstruction cannot be executed so as to update pertinent state information and to notify any appropriate functional units of the situation. Therefore, in accordance with an alternate embodiment of the present invention, the conditional move operation performed by the PSELECT microinstruction is combined with another microinstruction (referred to as SIGNAL_EVENT) such that the combination operates to conditionally signal a fault based upon the PSELECT condition.

In the exemplary case of privileged instruction checking, the macroinstruction MOV CR0 is a privileged instruction which should be executed normally if CPL=0, but should cause a fault if CPL≠0. Upon decoding of this macroinstruction, the microcoder would issue from its microcode ROM the following uops (assuming SOURCE1 and SOURCE2 are register values):

uop(1): SOURCE1=fault code
uop(2): SOURCE2=no fault code
uop(3): SOURCE3 :=PSELECT.CPL0(SOURCE2, SOURC1)
uop(4): SOURCE4 :=flags, data
uop(5): SINK :=SIGNAL_EVENT(SOURCE4, SOURCE3)

In the flow shown above, the SIGNAL_EVENT uop (uop(5)) is designed to signal an event (i.e. a fault) based upon the code that is selected by the PSELECT uop and subsequently placed in its SOURCE3 input. The SOURCE3 and SOURCE4 inputs of the SIGNAL_EVENT uop are written to corresponding fields of the ROB's PDST entry allocated for that uop upon its execution. In retirement of the SIGNAL_EVENT uop, the RCC 140 reads the code that has been written into the appropriate field of its PDST entry in the ROB 108 by the SIGNAL_EVENT uop (as selected by the PSELECT uop). If the fault error code was written into that field by the PSELECT uop, the RCC 140 will detect that a fault has occurred and will use the event information written into the fields of its ROB's PDST entry to vector to an appropriate fault handler microcode routine, while flushing all subsequent microinstructions including the flow for the privileged instruction. If the no fault error code was written into the field of the ROB's PDST entry for the SIGNAL_EVENT uop, then the RCC 140 detects that no fault has occurred and proceeds to retire the subsequent flow of microinstructions comprising the flow for the privileged instruction. In either case, retirement of the SIGNAL_EVENT uop from the ROB 108 will cause the results of the uop to be discarded because of its assignment to a dummy "bit-bucket" register denoted as SINK.

According to an alternative method for checking privileged instructions, PSELECT can be used in conjunction with a conditional jump uop to cause a fault to be signaled upon detecting a privilege violation. In this embodiment, the condition of the jump is based upon whether the zero flag is set in a particular microcode register T0 (determined by the result written to that register in execution of PSELECT). If the zero flag is set (i.e. T0 contains a zero), then a jump to a pointer pointing to a location in the microcode ROM will be conducted to invoke a fault handler microcode routine. Upon decoding of a privileged instruction, microcode issues the following sequence of uops into the microprocessor:

uop(3): T0:=PSELECT.CPL0(1,0)

uop(5): SINK := U_Jump_CC_ Z.direct(T0, fault_call_microcode_pointer)

If CPL=0, then a binary one will be assigned to register T0, thereby leaving the zero flag unset such that no conditional jump occurs and the normal flow of uop execution will continue. If CPL≠0, then a binary zero will be assigned to register T0, thereby setting the zero flag and causing a conditional jump to the location specified by the fault call microcode pointer. Although this example utilizes immediate values for the source inputs to the PSELECT microinstruction, this embodiment of the invention will work just as well using register values, constant values and memory values.

With regard to the execution of privilege or mode sensitive algorithms, these algorithms are actually a class of state dependent instructions that perform completely different operations depending upon the current state of the processor. Examples of such instructions in accordance with the Intel Architecture i486™ Instruction Set include but are not limited to instructions which modify the flags of the processor's control registers such as STI (set interrupt flag), CLI (clear interrupt flag) and IRET (interrupt return). With such instructions, the PSELECT operation can be utilized in two different ways.

In a first implementation, the following sequence of uops will be issued from microcode into the processor during decoding of the corresponding macroinstruction to cause a jump either to a first algorithm (A) or a second algorithm (B) based upon whether the processor is currently in real mode or not:

uop(1): T0 :=PSELECT_REAL(pointer_to_routine_A, pointer_to_routine_B)

uop(2): U_Jump(T0)

where the pointers are in the form of immediate values specifying the locations in the microcode ROM where the algorithms begin.

However, for some algorithms, in which a branch delay or a misprediction in the result of the jump would cause an unacceptable performance penalty by virtue of the clock cycles lost due to the branch, an alternate approach is to calculate both algorithms concurrently (i.e. in parallel) and to perform a PSELECT on one of the two results. This is accomplished by the following sequence of uops that would be issued from microcode where the value assigned to SOURCE2 is to be selected if in real mode and the value assigned to SOURCE1 is to be selected if not in real mode:

uop(1): SOURCE1<- AX+SI uop(2): SOURCE2<- BX-DI uop(3): T0 :=PSELECT_REAL(SOURCE2, SOURCE1)

Furthermore, PSELECT can also be used for instructions which perform privilege sensitive updates to processor state. The method in this case is similar to that described above for selecting execution of the proper algorithm. However, the difference here is that the original value of the state variable will be maintained if the modifying condition is not satisfied. For example, consider an instruction that is to update the state maintained in register CX if the processor is currently in real mode. In this case, since the hardware of the EU 116 has been configured to provide a value indicating the current state to microcode, the following sequence of uops will allow the state to be updated depending upon whether the condition is satisfied by the state value provided by the EU 116:

uop(1): T0<- CX+2 uop(2): CX :=PSELECT_REAL(T0, CX)

As shown above, the value to which the state is to be updated is assigned to T0. In execution of uop(2), the modified state value in T0 is selected if the processor is found to be in real mode, whereas if the processor is not in real mode, the unmodified state value in CX is selected.

In summary, PSELECT is utilized to perform state dependent operations in a microprocessor architecture, including but not limited to privilege and mode sensitive instruction checking, privilege and mode sensitive algorithm execution and state updating. Through the issuance of the PSELECT microinstruction from microcode to an EU 116, PSELECT can take advantage of the state information collected in hardware and centralized at the EU 116. In this manner, PSELECT can minimize the processor's performance losses in undertaking the numerous calculations required for normal MOVE operations, in stalling the pipeline upon detection of a possible change of state and in flushing the pipeline upon the occurrence of mispredicted branches during the processing of state dependent operations.

III. Computer System

Figure 3:
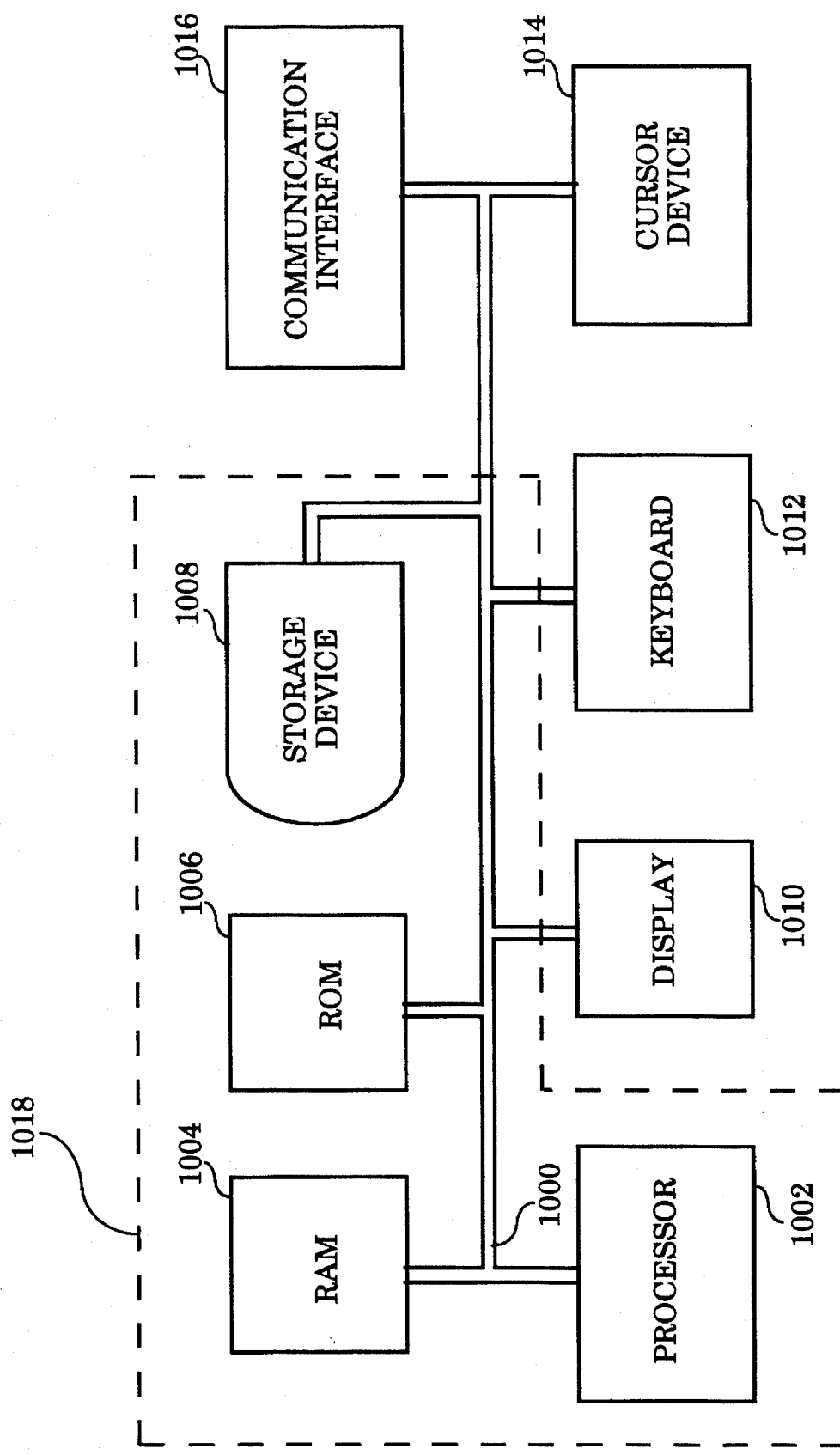
FIG. 3 is a block diagram of one embodiment of a computer system in which the out-of-order microprocessor of the present invention may be implemented.

The microprocessor of the present invention may be added to a general purpose computer system as shown in FIG. 3. Generally the computer system of the present invention comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement.

The computer system of FIG. 3 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. For example, the use of the Intel architecture and i486™ instruction set by the present invention is but one implementation. The present invention applies to other processor designs and instruction sets as well. Further, the present invention may be physically implemented in a variety packages. The present invention may be built into one integrated circuit package or have its functionality spread over a number of chips, or be implemented by an emulator. Moreover, the invention may be constructed on chips of different materials, such as silicon or gallium arsenide.

Finally, although the present invention allows speculative, out-of-order execution and is superscalar, aspects of the present invention operate effectively within both simple and more complex pipelined processors that perform neither speculative execution, out-of-order execution, nor superscalar operation. Therefore, the invention should be measured in terms of the claims which follow.

We claim:

1. In a processor having a decoder and an execution unit for executing microinstructions a method is provided for selecting one of two data values based upon control states of the processor, the method comprising the steps of:

providing a microinstruction indicating actions to be taken by the execution unit in resolving a specified condition, with resolution of the specified condition being contingent upon the control states of the processor;

providing a first data value as a first source input to the microinstruction;

providing a second data value as a second source input to the microinstruction; and issuing the microinstruction to the execution unit for execution, wherein during execution of the microinstruction, the first source input value is selected when the specified condition is determined to be true and the second source input value is selected when the specified condition is determined to be false.

2. In a processor having an execution unit for executing microinstructions and for providing a resolution to a specified condition and a decoder, a method is provided for selecting one of two data values based upon a specified condition, resolution of the specified condition being contingent on predetermined processor state values, the state values being selected from a group consisting of processor operating mode values and processor privilege values, the method comprising the steps of:

providing the predetermined processor state values to hardware circuitry of the execution unit;

providing a microinstruction indicating actions to be taken by the execution unit in resolving the specified condition;

providing a first data value as a first source input to the microinstruction;

providing a second data value as a second source input to the microinstruction;

issuing the microinstruction to the execution unit for execution;

reading the predetermined processor state values provided to the execution unit;

resolving the specified condition in the execution unit;

selecting the first source input value of the microinstruction when the specified condition is true;

selecting the second source input value of the microinstruction when the specified condition is false; and allocating a storage location to which the selected source input value will be written, the storage location being preselected from a group consisting of a processor register, a memory location within the processor and a memory location external to the processor.

3. The method according to claim 2, wherein the method further comprises the steps of:

writing the selected source input value to the storage location, the storage location comprising the processor register having an associated flag;

setting the associated flag when the selected source input value written to the processor register comprises a binary zero;

clearing the associated flag when the selected source input value written to the processor register does not comprise a binary zero; and writing the flag to the storage location allocated.

4. The method according to claim 2, wherein the first data value and the second data value provided to the microinstruction comprise values selected from the group consisting of register values, immediate values, constant values and memory values.

5. The method according to claim 2, wherein the processor operating mode values and processor privilege values represent Intel Processor Architecture operating modes and privilege states.

6. In an out-of-order processor having a decoder, at least one execution unit for executing microinstructions out-of-order and a reorder buffer having storage locations provided for buffering execution results of corresponding microinstructions, a method is provided for selecting one of two data values based upon control states of the processor, the method comprising the steps of:

providing a microinstruction indicating actions to be taken by the execution unit in resolving a specified condition;

providing a first data value as a first source input to the microinstruction;

providing a second data value as a second source input to the microinstruction;

issuing the microinstruction to the execution unit for execution;

determining the control states of the processor;

resolving the specified condition in the execution unit;

selecting the first source input value of the microinstruction when the specified condition is true; and selecting the second source input value of the microinstruction when the specified condition is false.

7. The method according to claim 6, wherein the step of determining the control states of the processor is performed by the steps of:

providing predetermined values to hardware circuitry of the execution unit, the predetermined values comprising processor control state values selected from the group consisting of processor operating mode values and processor privilege values; and reading the predetermined values provided to the execution unit.

8. The method according to claim 6, wherein the method further comprises the step of allocating a storage location to which the selected source input value will be written, the storage location comprising one of a processor register, a memory location within the processor and a memory location external to the processor.

9. The method according to claim 8, wherein the method further comprises the steps of:

writing the selected source input value to the storage location, the storage location comprising the processor register, the processor register having an associated flag;

setting the associated flag when the selected source input value written to the processor register comprises a binary zero;

clearing the associated flag when the selected source input value written to the processor register does not comprise a binary zero; and writing the flag to the storage location allocated.

10. The method according to claim 6, wherein the processor further comprises a dispatch buffer for temporarily storing the microinstruction until the execution unit is available, an instruction decoder having microcode read only memory for decoding instructions into the microinstruction and an allocator for assigning the microinstruction storage location in each of the dispatch buffer and the reorder buffer, and wherein the step of issuing the microinstruction to the execution unit for execution is performed by issuing the microinstruction from the microcode read only memory of the instruction decoder upon detection of an instruction the execution of which depends upon the control states of the processor.

11. The method according to claim 6, wherein the first data value and the second data value to the microinstruction comprise values selected from the group consisting of register values, immediate values, constant values and memory values.

12. The method according to claim 6, wherein the processor control states comprises states selected from the group consisting of processor operating mode states and processor privilege states.

13. An apparatus provided in a processor having a decoder, the apparatus for selecting one of two data values based upon control states of the processor, the apparatus comprising:

a decoder for providing a sequence of microinstructions, each microinstruction having an opcode indicating actions to be taken by the processor in resolving a specified condition, a first source input value and a second source input value;

an execution unit for executing microinstructions, the execution unit having hardware circuitry for collecting predetermined control state values to be used in resolving the specified condition, the predetermined state values being selected from a group consisting of processor operating mode values and processor privilege values, the execution unit executing each microinstruction to produce as output the first source input value of the microinstruction when the specified condition is true and the second source input value of the microinstruction when the specified condition is false.

14. The apparatus according to claim 13, wherein the execution unit in execution of the microinstruction further writes the selected source input value to a storage location, the storage location being selected from the group consisting of a processor register, a memory location within the processor and a memory location external to the processor.

15. The apparatus according to claim 14, wherein the processor comprises an out-of-order processor in which the execution unit of the processor executes microinstructions out-of-order, the storage location including a location within a reorder buffer, the reorder buffer buffering execution results and data after execution of corresponding microinstructions.

16. The apparatus according to claim 15, wherein the processor further comprises a dispatch buffer for temporarily storing microinstructions until the execution unit is available, an instruction decoder having microcode read only memory for decoding instructions into microinstructions and an allocator for assigning microinstructions storage locations in the dispatch buffer and the reorder buffer, and wherein each microinstruction is issued from the microcode read only memory of the instruction decoder upon detection of the instruction the execution of which depends upon the control states of the processor.

17. The apparatus according to claim 14, wherein the storage location comprises a processor register having an associated flag and the selected source input value written to the processor register causes the associated flag to be set when the selected source input value comprises a binary zero, the selected source input value written to the processor register further causing the associated flag to be cleared when the selected source input value does not comprises a binary zero.

18. The apparatus according to claim 13, wherein the first source input value and the second source input value of the microinstruction comprise values selected from the group consisting of register values, immediate values, constant values and memory values.

19. The apparatus according to claim 13, wherein the predetermined control state values comprise values selected from the group consisting of processor operating mode values and processor privilege values.

20. The apparatus according to claim 19, wherein the processor operating mode values and processor privilege values comprise values corresponding to operating modes and privileges defined by the Intel Architecture.

21. The apparatus according to claim 13, wherein the processor is implemented in a computer system comprising an input/output means for providing a communications interface and a memory means coupled to the input/output means for providing input data and output data to interface with a computer user.

* * * * *

UNITED STATES PATENT AND TRADEMARK OFFICE
CERTIFICATE OF CORRECTION

PATENT NO.    :    5,537,560
DATED         :    July 16, 1996
INVENTOR(S)   :    Boggs et al.

It is certified that error appears in the above-identified patent and that said Letters Patent is hereby corrected as shown below:

In column 2, at line 39, delete "5)" and substitute --15)--.

In column 6, at line 41, delete "pipestailing" and substitute --pipestalling--.

In column 10, at line 13, insert --IF-- before "[(CPL=0".

In column 10, at line 13, delete "(OPL=3)" and substitute --(IOPL=3)--.

In column 14, at line 40, delete "a specified" and substitute --the specified--.

Signed and Sealed this

Fifteenth Day of October, 1996

Attest:

BRUCE LEHMAN

Attesting Officer    Commissioner of Patents and Trademarks